United States Patent [19]

Cantatore et al.

[11] 4,279,804
[45] Jul. 21, 1981

[54] PIPERIDINE COMPOUNDS AND THEIR USE AS STABILIZERS FOR SYNTHETIC POLYMERS

[75] Inventors: Giuseppe Cantatore, Casalecchio Di Reno; Paolo Cassandrini, Bologna, both of Italy

[73] Assignee: Chimosa Chimica Organica S.p.A., Italy

[21] Appl. No.: 20,088

[22] Filed: Mar. 13, 1979

[30] Foreign Application Priority Data

Jul. 28, 1978 [IT] Italy ............................. 26239 A/78

[51] Int. Cl.³ .................................................. C07D 239/04
[52] U.S. Cl. ............................. 260/45.8 N; 546/186; 546/187; 544/242; 544/333
[58] Field of Search .............. 546/186, 187; 544/242, 544/333; 260/45.8 N

[56] References Cited

U.S. PATENT DOCUMENTS

| | | |
|---|---|---|
| 2,987,522 | 6/1961 | Shen ..................................... 544/242 |
| 3,513,170 | 5/1970 | Murayama et al. ................... 544/242 |
| 3,816,439 | 6/1974 | Sulzbach ....................... 260/245.8 N |
| 3,932,431 | 1/1976 | Walter ................................... 544/333 |

Primary Examiner—Nicholas S. Rizzo
Attorney, Agent, or Firm—Morgan, Finnegan, Pine, Foley & Lee

[57] ABSTRACT

New piperidine compounds of the formula

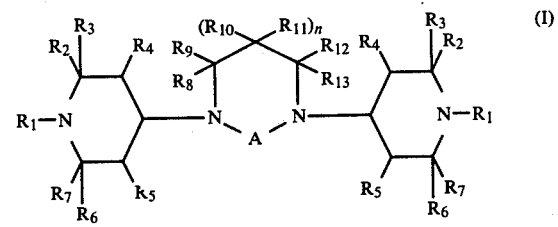

in which the radicals have the meanings indicated in the specification and which are stabilizers against light, heat and oxidation for synthetic polymers.

16 Claims, No Drawings

PIPERIDINE COMPOUNDS AND THEIR USE AS STABILIZERS FOR SYNTHETIC POLYMERS

This invention relates to new piperidine compounds which can be used as stabilisers against light, heat and oxidation for synthetic polymers, and to the process for their preparation.

More precisely, this invention relates to new compounds of formula

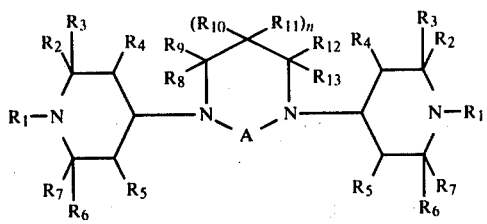

in which:

$R_1$ represents hydrogen, —O°, —CN, a linear or branched alkyl containing 1 to 20 carbon atoms, an alkenyl or alkinyl containing 2 to 20 carbon atoms, benzyl, benzyl substituted by 1 to 3 alkyls containing 1 to 4 carbon atoms, hydroxybenzyl, hydroxybenzyl substituted by 1 to 3 alkyls containing 1 to 4 carbon atoms; or a —$COR_{14}$, —$COOR_{14}$, —$CH_2COOR_{14}$ or —$CONR_{14}R_{15}$ radical in which $R_{14}$, $R_{15}$, which can be equal or different, represent a linear or branched alkyl containing 1 to 20 carbon atoms, an alkenyl containing 2 to 20 carbon atoms, a cycloalkyl containing 5 to 12 carbon atoms, phenyl substituted by 1 to 3 alkyls containing 1 to 8 carbon atoms, hydroxyphenyl, hydroxyphenyl substituted by 1 to 3 alkyls containing 1 to 4 carbon atoms, an aralkyl containing 7 to 12 carbon atoms, or when bonded to N they can be hydrogen, or together with the N to which they are bonded they can form a nitrogeneous heterocyclic ring of 5 to 8 terms; or a

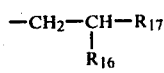

radical in which $R_{16}$ is hydrogen or methyl, and $R_{17}$ is —OH, —$OR_{14}$, —$OCOR_{14}$ or —$OCONR_{14}R_{15}$, in which $R_{14}$ and $R_{15}$ are always as heretofore defined; or a

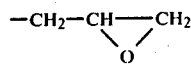

radical;

$R_2, R_3, R_6, R_7$, which can be equal or different, represent an alkyl containing 1 to 6 C atoms;

$R_4, R_5$, which can be equal or different, represent hydrogen or an alkyl containing 1 to 6 C atoms;

$R_8, R_9, R_{10}, R_{11}, R_{12}, R_{13}$, which can be equal or different, represent hydrogen or an alkyl containing 1 to 6 carbon atoms;

n is zero or 1;

A represents >C=O, >C=S, or >CH—$R_{18}$ in which $R_{18}$ is hydrogen, an alkyl containing 1 to 20 carbon atoms, a cycloalkyl containing 5 to 12 carbon atoms, phenyl, a hydroxyphenyl, a hydroxyphenyl substituted by 1 to 3 alkyls containing 1 to 4 carbon atoms, benzyl, or benzyl substituted by 1 to 3 alkyls containing 1 to 4 carbon atoms.

The following can be indicated as particular examples of the various radicals:

for $R_1$: hydrogen, —O°, —CN, methyl, ethyl, n-propyl, n-butyl, isobutyl, n-hexyl, n-octyl, n-decyl, n-dodecyl, n-octadecyl, allyl, 2-butenyl, 10-undecenyl, oleyl, propargyl, benzyl, 4-methylbenzyl, 4-t-butylbenzyl, 4-hydroxybenzyl, 3,5-di-t.butyl-4-hydroxybenzyl;

for $R_{14}$, $R_{15}$: methyl, ethyl, n-propyl, n-butyl, n-hexyl, n-octyl, n-decyl, n-dodecyl, allyl, 2-butenyl, 10-undecenyl, oleyl, cyclohexyl, 2- or 4-methylcyclohexyl, 3,3,5-trimethylcyclohexyl, phenyl, 2- or 4-methylphenyl, 2,4 or 2,6-dimethylphenyl, 4-t-butylphenyl, 3,5-di-t-butyl-4-hydroxyphenyl, benzyl, 4-methylbenzyl, 4-t-butylbenzyl; furthermore, when $R_{14}$, $R_{15}$ are bonded to an N, they are preferably hydrogen, or together with the N atom to which they are bonded, they form part for example of the ring of pyrrolidine, piperidine, morpholine, piperazine, N-methylpiperazine, homopiperazine, N-methylhomopiperazine;

for the

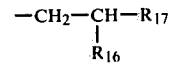

group: —$CH_2CH_2OH$, —$CH_2CHOHCH_3$, —$CH_2CH_2OCH_3$, $CH_2CH_2OC_2H_5$, —$CH_2CH_2OC_4H_9$, —$CH_2CH_2OCOCH_3$, —$CH_2CH_2OCOC_3H_7$, —$CH_2CH_2OCON(CH_3)_2$, —$CH_2CH_2OCON(C_2H_5)_2$;

for $R_2, R_3, R_6, R_7$: methyl or ethyl;

for $R_4, R_5, R_8, R_9, R_{10}, R_{11}, R_{12}, R_{13}$: hydrogen or methyl;

for $R_{18}$: hydrogen, methyl, ethyl, n-propyl, isopropyl, n-butyl, isobutyl, n-pentyl, n-hexyl, n-heptyl, n-octyl, n-nonyl, n-decyl, n-undecyl, cyclohexyl, phenyl, o- or p-hydroxyphenyl, 3,5-dimethyl-4-hydroxyphenyl, 3,5-di-t-butyl-4-hydroxyphenyl, benzyl, 4-methylbenzyl, 4-t-butylbenzyl.

The new piperidine compounds according to the present invention are prepared starting from N,N'-bis(-polyalkyl-4-piperidyl)alkylenediamine of formula

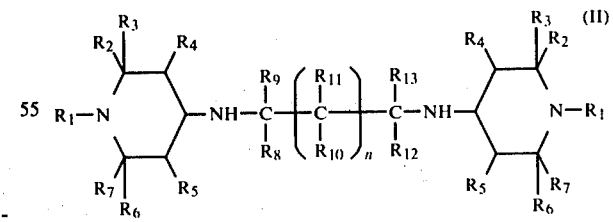

in which $R_1, R_2, R_3, R_4, R_5, R_6, R_7, R_8, R_9, R_{10}, R_{11}, R_{12}, R_{13}$, are as heretofore defined.

When A is a >C=O group, the compounds of formula (I) can be synthesised by reacting the dipiperidylalkylenediamines of formula (II) with urea, the molar ratio of these two reagents lying between 1:1.25 and 2:1. This reaction can be carried out either with or without solvent, at a temperature of 100° to 250° C., preferably 120° to 200° C. The reaction solvent used can be an organic solvent such as n-butanol, n-pentanol, n-hexanol, 2-ethoxyethanol, 2-n-butoxyethanol, ethyleneglycol, dimethylformamide, dimethylacetamide, dimethylsulphoxide.

As an alternative to urea, the substance used to form with the compounds of formula II a heterocyclic ring comprising the >CO group can include phosgene, cyanic acid, CO$_2$, carbonic acid esters, chlorocarbonic acid esters, or carbamic acid esters. However, urea is the preferred reagent. When A represents a >C=S group, the compounds of formula (I) can be prepared by reacting a dipiperidylalkylenediamine of formula (II) with carbon disulphide and then decomposing the dithiocarbamate formed as an intermediate compound, by heating either in the presence or the absence of strong mineral acids at a temperature of 50° to 200° C., preferably 80° to 150° C.

When A is a >CH—R$_{18}$ group, the compounds of formula (I) can be prepared by reacting a dipiperidylalkylenediamine of formula (II) with an aldehyde of formula R$_{18}$CHO, in organic solvents such as benzene, toluene, xylene, n-octane, cyclohexane, chlorobenzene, at a temperature of 50° to 150° C., preferably 80° to 120° C.

Compounds of formula (I) in which R$_1$ is other than hydrogen can be obtained starting from dipiperidyldiamines of formula (II) already substituted at the piperidine NH's, or by substituting at the NH group of the compounds of formula (I), in which R$_1$ is hydrogen.

In this case, the compounds of formula (I) in which R$_1$ is an oxyl radical can be obtained from the corresponding compounds in which R$_1$ is hydrogen, by reaction with hydrogen peroxide in the presence of sodium tungstate, or by reaction with a peracid, such as m-chloroperbenzoic acid. The compounds in which R$_1$ is a —CN group can be obtained from the corresponding compounds in which R$_1$ is hydrogen, by reaction with CNCl or CNBr. The compounds in which R$_1$ is an alkyl, alkenyl, alkinyl or benzyl group can be prepared from the corresponding compounds in which R$_1$ is hydrogen, by reaction with alkyl, alkenyl, alkinyl, benzyl or substituted benzyl halides. The compounds in which R$_1$ is methyl can also be prepared from the corresponding compounds in which R$_1$ is hydrogen, by reaction with formaldehyde and formic acid (Eschweiler-Clarke reaction, Organic Reactions, Vol. V, page 307, Wiley & Sons, 1962).

The compounds in which R$_1$ is a —COR$_{14}$, —COOR$_{14}$, —CH$_2$COOR$_{14}$ or —CONR$_{14}$R$_{15}$ group can be prepared from the corresponding compounds in which R$_1$ is hydrogen, by reaction with halogen compounds of the X-COR$_{14}$, X-COOR$_{14}$, X-CH$_2$COOR$_{14}$ or X-CONR$_{14}$R$_{15}$ type, in which X represents a halogen, preferably chlorine, bromine or iodine, and R$_{14}$ and R$_{15}$ have the meaning already illustrated. The compunds in which R$_1$ is

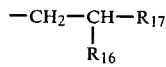

can be prepared from the corresponding compounds in which R$_1$ is hydrogen, by reaction with ethylene oxide or propylene oxide, if R$_{17}$ is —OH. If R$_{17}$ is —OR$_{14}$, —OCOR$_{14}$ or —OCONR$_{14}$R$_{15}$, it can be prepared by subsequent reaction of the hydroxylated compound with a halogen compound of the X-R$_{14}$, X-COR$_{14}$ or X-CONR$_{14}$R$_{15}$ type, in which X, R$_{14}$, R$_{15}$ have the meaning heretofore defined. The compounds in which R$_1$ is a 2,3-epoxypropyl group can be obtained by reacting the corresponding compounds in which R$_1$ is hydrogen, with epichlorydrine and an alkaline hydrate. The compounds of formula (II), which are the starting substances for the process according to the present invention, have been obtained by reductive alkylation of alkylenediamines of formula (III)

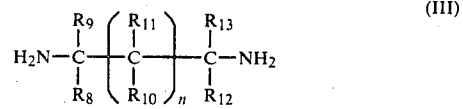

with polyalkyl-4-piperidones of formula (IV)

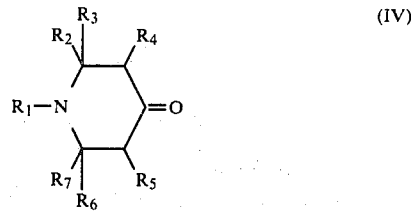

in the presence of hydrogen and hydrogenation catalysts, as described in U.S. Pat. No. 3,480,635.

Preferred examples of compounds according to the present invention are:
1,3-bis(2,2,6,6-tetramethyl-4-piperidyl)-2-imidazolidone
1,3-bis(1,2,2,6,6-pentamethyl-4-piperidyl)-2-imidazolidone
1,3-bis(2,2,6,6-tetramethyl-4-piperidyl)-4-methyl-2-imidazolidone
1,3-bis(1,2,2,6,6-pentamethyl-4-piperidyl)-4-methyl-2-imidazolidone
1,3-bis(1-ethyl-2,2,6,6-tetramethyl-4-piperidyl)-2-imidazolidone
1,3-bis(1-n-butyl-2,2,6,6-tetramethyl-4-piperidyl)-2-imidazolidone
1,3-bis(1-n-octyl-2,2,6,6-tetramethyl-4-piperidyl)-2-imidazolidone
1,3-bis[1(2-hydroxyethyl)-2,2,6,6-tetramethyl-4-piperidyl]-2-imidazolidone
1,3-bis(1-benzyl-2,2,6,6-tetramethyl-4-piperidyl)-2-imidazolidone
1,3-bis(1-ethoxycarbonylmethyl-2,2,6,6-tetramethyl-4-piperidyl)-2-imidazolidone
1,3-bis(1-acetyl-2,2,6,6-tetramethyl-4-piperidyl)-2-imidazolidone
1,3-bis(2,6-diethyl-2,3,6-trimethyl-4-piperidyl)-2-imidazolidone
1,3-bis(2,2,6,6-tetramethyl-4-piperidyl)-2-imidazolidinethione
1,3-bis(1,2,2,6,6-pentamethyl-4-piperidyl)-2-imidazolidinethione
1,3-bis(2,2,6,6-tetramethyl-4-piperidyl)imidazolidine
1,3-bis(1,2,2,6,6-pentamethyl-4-piperidyl)imidazolidine
1,3-bis(2,2,6,6-tetramethyl-4-piperidyl)-2-methylimidazolidine
1,3-bis(2,2,6,6-tetramethyl-4-piperidyl)-2-ethylimidazolidine
1,3-bis(2,2,6,6-tetramethyl-4-piperidyl)-2-n-propylimidazolidine 1,3-bis(2,2,6,6-tetramethyl-4-piperidyl)-2-isopropylimidazolidine
1,3-bis(2,2,6,6-tetramethyl-4-piperidyl)-2-n-butylimidazolidine
1,3-bis(2,2,6,6-tetramethyl-4-piperidyl)-2-n-hexylimidazolidine
1,3-bis(2,2,6,6-tetramethyl-4-piperidyl)-2-phenylimidazolidine
1,3-bis(2,2,6,6-tetramethyl-4-piperidyl)-2(o-hydroxyphenyl)imidazolidine
1,3-bis(2,2,6,6-tetramethyl-4-piperidyl)hexahydropyrimidine
1,3-bis(1,2,2,6,6-pentamethyl-4-piperidyl)hexahydropyrimidine
1,3-bis(1-ethyl-2,2,6,6-tetramethyl-4-piperidyl)hexahydropyrimidine
1,3-bis(2,2,6,6-tetramethyl-4-piperidyl)-2-methylhexahydropyrimidine
1,3-bis(2,2,6,6-tetramethyl-4-piperidyl)-2-ethylhexahydropyrimidine
1,3-bis(2,2,6,6-tetramethyl-4-piperidyl)-2-n-propylhexahydropyrimidine
1,3-bis(2,2,6,6-tetramethyl-4-piperidyl)-2-n-butylhexahydropyrimidine
1,3-bis(2,2,6,6-tetramethyl-4-piperidyl)-2-n-hexylhexahydropyrimidine
1,3-bis(2,2,6,6-tetramethyl-4-piperidyl)hexahydro-2-pyrimidinone
1,3-bis(1,2,2,6,6-pentamethyl-4-piperidyl)hexahydro-2-pyrimidinone
1,3-bis(2,2,6,6-tetramethyl-4-piperidyl)hexahydro-2-pyrimidinethione
1,3-bis(1,2,2,6,6-pentamethyl-4-piperidyl)hexahydro-2-pyrimidinethione For the purpose of better illustrating the present invention, some examples of preparation of compound of formula (I) are given hereinafter by way of non-limiting example only.

EXAMPLE 1

338 g (1 mole) of N,N'bis(2,2,6,6-tetramethyl-4-piperidyl)ethylenediamine and 63 g (1.05 moles) of urea are heated at 200° C. for 10 hours under a slight current of nitrogen.

The reaction product obtained is crystallised from xylol.

A compound is obtained of formula

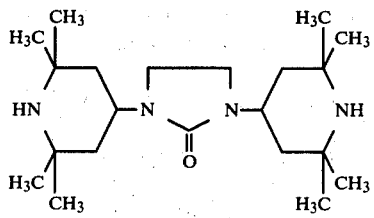

Melting at 243°–5° C.

Analysis for $C_{21}H_{40}N_4O$: calculated: C 69.18%; H 11.06%; N 15.37%. found: C 69.05%; H 11.10%; N 15.28%.

EXAMPLE 2

36.45 g (0.1 moles) of 1,3-bis(2,2,6,6-tetramethyl-4-piperidyl) 2-imidazolidone, prepared in accordance with example 1, 54.1 g (1 mole) of 85% formic acid and 100 g (1.23 moles) of 37% formaldehyde are heated under reflux for eight hours. After cooling to ambient temperature, the reaction mixture is diluted with 200 ml of water and is alkalified with 10% aqueous NaOH.

The precipitate obtained is separated by filtration, washed with water, dried and crystallised from xylol.

A compound is obtained of formula:

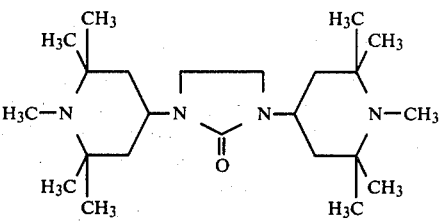

Melting at 263°–5° C.

Analysis for $C_{23}H_{44}N_4O$ calculated: C 70.36%; H 11.29%; N 14.27%. found: C 70.23%; H 11.27%; N 14.15%.

EXAMPLE 3

52.8 g (0.15 moles) of N,N'-bis(2,2,6,6-tetramethyl-4-piperidyl)-1,2-diaminopropane, 9.9 g (0.165 moles) of urea and 200 ml of 2-ethoxyethanol are heated under reflux for ten hours. The reaction mixture is evaporated to dryness, and the residue obtained is crystallised twice from n-octane. A compound is obtained of formula:

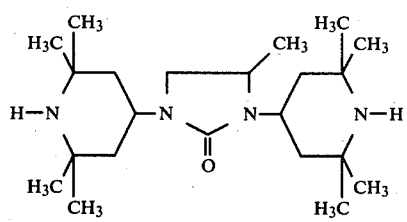

Melting at 153°–155° C.

Analysis of $C_{22}H_{42}N_4O$: calculated: C 69.79%; H 11.18%; N 14.80%. found: C 69.70%; H 11.21%; N 14.75%.

EXAMPLE 4

A solution of 7.6 g of carbon disulphide (0.1 moles) in 20 ml of isopropanol are added over a period of 20 minutes to a solution of 33.8 g (0.1 moles) of N,N'-bis(2,2,6,6-tetramethyl-4-piperidyl)ethylenediamine in 100 ml of isopropanol. The mixture is then heated for two hours at 60° C., and one hour under reflux. 1 ml of 37% hydrochloric acid is added, and the mixture refluxed for a further 30 hours. After cooling, the reaction mixture is filtered and the residue obtained is crystallised twice from methanol.

A compound is obtained of formula:

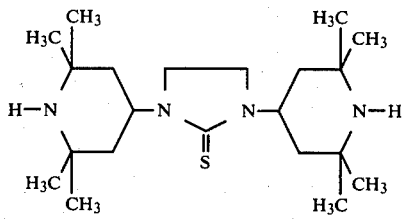

Melting at 254°–5° C.

Analysis for $C_{21}H_{40}N_4S$: calculated: C 66.27%; H 10.59%; N 14.72%; S 8.42%. found: C 66.18%; H 10.61%; N 14.75%; S 8.39%.

EXAMPLE 5

38 g (0.1 moles) of 1,3-bis(2,2,6,6-tetramethyl-4-piperidyl)-2-imidazolidinethione, prepared in accordance with example 4, 54.1 g (1 mole) of 85% formic acid and 81 g (1 mole) of 37% formaldehyde are heated under reflux for six hours. After cooling to ambient temperature, the mixture obtained is diluted with 200 ml of water and alkalified with 10% aqueous sodium hydrate. The precipitate obtained is separated by filtration, washed with water, dried and crystallised from a 5:3 chloroform-methanol mixture.

A compound is obtained of formula

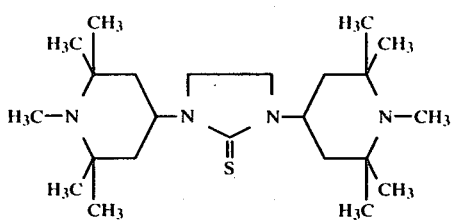

Melting at 268°–270° C.

Analysis for $C_{23}H_{44}N_4S$: calculated: C 67.59%; H 10.85%; N 13.71%; S 7.85%. found: C 67.51%; H 10.73%; N 13.70%; S 7.73%.

EXAMPLE 6

36.45 g (0.1 moles) of 1,3-bis(2,2,6,6-tetramethyl-4-piperidyl)-2-imidazolidone, 46.8 g (0.3 moles) of ethyl iodide, 20 g (0.5 moles) of sodium hydrate and 250 ml of toluene are heated under reflux for 36 hours. After filtration to separate the inorganic products, the solvent is evaporated under reduced pressure, and the residue is crystallised from isopropanol.

A compound is obtained of formula:

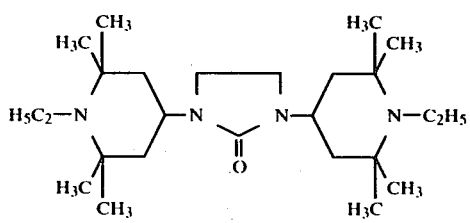

Melting at 218°–220° C.

Analysis for $C_{25}H_{48}N_4O$: calculated: C 71.38%; H 11.50%; N 13.32%. found: C 71.19%; H 11.37%; N 13.28%.

EXAMPLE 7

36.45 g (0.1 moles) of 1,3-bis(2,2,6,6-tetramethyl-4-piperidyl)-2-imidazolidone, 32.55 g (0.3 moles) of ethyl chloroformate, 41.4 g (0.3 moles) of potassium carbonate and 300 ml of toluene are heated under reflux for 20 hours.

After filtration to separate the inorganic products, the filtrate is evaporated to dryness under reduced pressure.

The residue obtained is crystallised from isopropanol.

A compound is obtained of formula:

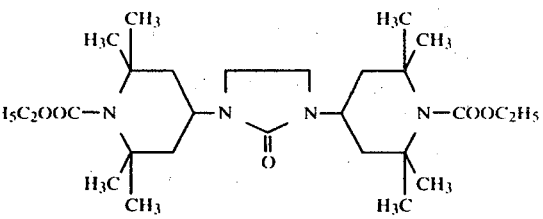

Melting at 237°–8° C.

Analysis for $C_{27}H_{48}N_4O_5$: calculated: C 63.75%; H 9.51%; N 11.01%. found: C 63.57%; H 9.43%; N 11.06%.

EXAMPLE 8

33.8 g (0.1 moles) of N,N'-bis(2,2,6,6-tetramethyl-4piperidyl)ethylenediamine, 10 g of 37% formaldehyde (0.12 moles) and 250 ml of toluene are heated under reflux for eight hours, with azeotropic separation of the water. On termination of the reaction, the mixture obtained is evaporated to dryness, and the solid residue is crystallised from n-octane.

A compound is obtained of formula:

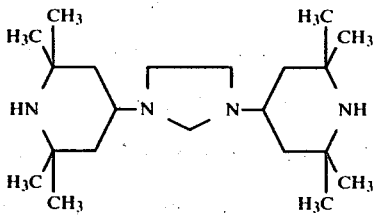

Melting at 119°–121° C.

Analysis for $C_{21}H_{42}N_4$: calculated: C 71.94%; H 12.07%; N 15.98%. found: C 71.82%; H 12.01%; N 15.87%.

EXAMPLE 9

114 g (1 mole) of n-heptaldehyde are added over 30 minutes to 338 g (1 mole) of N,N'-bis(2,2,6,6-tetramethyl-4-piperidyl)ethylenediamine dissolved in 1000 ml of benzene. The mixture is heated under reflux for 8 hours, separating the water of reaction azeotropically. The benzene is removed by distillation, to give the oily product which is distilled under vacuum at 0.2 mm Hg.

A comound is obtained of formula:

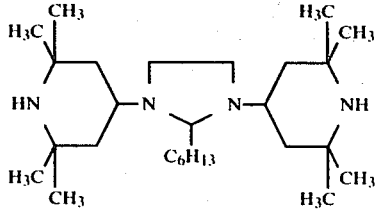

B.P. 178°–180° C./0.2 mm Hg.

Analysis for $C_{27}H_{54}N_4$: calculated: C 74.59%; H 12.52%; N 12.89%. found: C 74.50%; H 12.45%; N 12.87%.

EXAMPLE 10

114 g (1 mole) of n-heptaldehyde are added over 30 minutes to 352 g (1 mole) of N,N'-bis(2,2,6,6-tetramethyl-4-piperidyl)trimethylenediamine dissolved in 1000 ml of benzene.

The mixture is heated under reflux for 8 hours, separating the water of reaction azeotropically.

The benzene is removed by distillation, to give an oily product which is purified by distillation under vacuum (0.4 mm Hg).

A compound is obtained of formula:

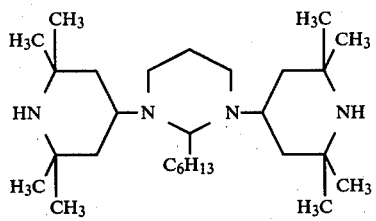

B.P. 195°–7° C. at 0.4 mm Hg.

Analysis for $C_{28}H_{56}N_4$: calculated: C 74.94%; H 12.57%; N 12.48%; found: C 74.81%; H 12.54%; N 12.40%.

As initially stated, compounds of formula (I) are very effective in increasing the light, heat and oxidation resistance of synthetic polymers, such as high and low density polyethylene, polypropylene and ethylene-propylene copolymers, ethylene-vinylacetate copolymers, polybutadiene, polyisoprene, polystyrene, butadiene-styrene copolymers, acrylonitrile-butadiene-styrene copolymers, polyoxymethylene, polyurethanes, polyamides, polyethylene terephthalate and unsaturated polyesters.

The compounds of formula (I) may be used in mixture with the synthetic polymers in various proportions depending on the nature of the polymer, the final use and the presence of other additives.

In general, it is appropriate to use 0.01 to 5% by weight of the compounds of formula (I) relative to the weight of the polymers, and preferably 0.1 to 1%.

The compounds of formula (I) may be incorporated into the polymer materials by various methods such as dry mixing in powder form, or wet mixing in the form of a solution or suspension or in the form of a master batch. In such operations, the synthetic polymer may be used in the form of powder, granules, solution, suspension or emulsion. The polymers stabilised by means of products of formula (I) may be used for preparing moulded objects, films, stretched tapes, fibres, monofilaments and the like.

Other additives may be added, if required, to the mixture of the compounds of formula (I) and the synthetic polymers, such as anti-oxidants, UV absorbers, nickel stabilisers, pigments, fillers, plasticisers, antistatic agents, flame retardants, lubricating agents, corrosion protectors and metal deactivators.

Examples of additives which may be used in mixture with the compounds of formula (I) are, in particular:
phenolic anti-oxidants, such as 2,6-di-t-butyl-p-cresol, 4,4'-thiobis(3-methyl-6-t-butylphenol), 1,1,3-tris(2-methyl-4-hydroxy-5-t-butylphenyl)-butane, octadecyl 3-(3,5-di-t-butyl-4-hydroxyphenyl)propionate, pentaerithritol tetrakis(3,5-di-t-butyl-4-hydroxyphenyl)propionate, tris(3,5-di-t-butyl-4-hydroxybenzyl)isocyanurate; tris(4-t-butyl-3-hydroxy-2,6-dimethylbenzyl)isocyanurate;
thiodipropionic acid esters such as di-n-dodecylthiodipropionate, di-n-octadecyl thiodipropionate;
aliphatic sulphides and disulphides such as di-n-dodecyl sulphide, di-n-octadecyl sulphide, di-n-octadecyl disulphide;
aliphatic, aromatic or aliphatic-aromatic phosphites and thiophosphites, such as tri-n-dodecyl phosphite, tri(nonyl-phenyl)phosphite, tri-n-dodecyl trithiophosphite, phenyl di-n-decyl phosphite, di-n-octadecyl pentaerithritol diphosphite, tris(2,4-di-t-butyl phenyl)phosphite, tetrakis(2,4-di-t-butylphenyl)-4,4'-biphenylenediphosphonite;
UV absorbers such as 2-hydroxy-4-n-octyloxybenzophenone, 2-hydroxy-4-n-dodecyloxybenzophenone, 2-(2'-hydroxy-3',5'-di-t-butylphenyl)-5-chlorobenzotriazole, 2-(2'-hydroxy-3',5'-di-t-amylphenyl)benzotriazole, 2,4-di-t-butylphenyl 3,5-di-t-butyl-4-hydroxybenzoate, phenylsalicylate, p-t-butylphenylsalicylate, 2,2'-dioctyloxy-5,5'-di-t-butyloxyanylide, 2-ethoxy-5-t-butyl-2'-ethyloxanylide;
Nickel light stabilisers such as Ni monomethyl 3,5-di-t-butyl-4-hydroxybenzylphosphonate, complex butylamine-Ni 2,2'-thiobis(4-t-octyl-phenolate), Ni 2,2'-thiobis(4-octyl-phenolphenolate), Ni dibutyldithiocarbamate, Ni 3,5-di-t-butyl-4-hydroxybenzoate, Ni complex of 2-hydroxy-4-n-octyloxybenzophenone; organostannic compounds such as dibutyltin maleate, dibutyltin laurate, dioctyltin maleate; acrylic esters such as ethyl $\alpha$-cyan-$\beta,\beta$-diphenylacrylate, methyl $\alpha$-cyan-$\beta$-methyl-4-methoxycinnamate:
metal salts of higher fatty acids such as calcium, barium, cadmium, zinc, lead, nickel stearates, calcium, cadmium, zinc, barium, laurates; organic and inorganic pigments such as Colour Index Pigment Yellow 37, Colous Index Pigment Yellow 83, Colour Index Pigment Red 144, Colour Index Pigment Red 48:3, Colour Index Pigment Blue 15, Colour Index Pigment Green 7, titanium dioxide, iron oxides and the like.

The effectiveness of the products prepared according to the invention as stabilisers is illustrated in the following examples in which the products of examples 1 to 10 are used in a synthetic polymer composition.

The results are compared with those obtained by adding known commercially available stabilisers.

EXAMPLE 11

2 g of each of the compounds of examples 1–10 and 1 g of 2,6-di-t-butyl-p-creosol (antioxidant) are mixed intimately with 1000 g of polypropylene MI=3.3 (Moplen C, produced by Montedison) and 1 g of calcium stearate. The mixture obtained is then extruded at at a temperature of 200°–230° C. and transformed into granules, from which stretched tapes are obtained having a thickness of 40 μm and a width of 3 mm.

The operating conditions are:
temperature of extruder: 230°–240° C.
temperature of head: 240° C.
stretching ratio: 1:6

The tapes obtained are exposed in a Weather-Ometer 65 WR (ASTM G 27-70) with a black panel temperature of 63° C.

Samples are withdrawn periodically, of which the residual tensile strength is measured by means of a constant speed dynamometer. The exposure time necessary for halving the initial tensile strength ($T_{50}$) is then evaluated. For comparison, a stretched tapes is prepared under the same conditions with the addition of 2 g of 2-hydroxy-4-n-octyloxybenzophenone as a light stabiliser.

Table 1 shows the results obtained.

TABLE 1

| Stabiliser | $T_{50}$ (hours) |
| --- | --- |
| 2-hydroxy-4-n-octyloxybenzophenone | 380 |
| Compound of example 1 | 2200 |
| Compound of example 2 | 2520 |
| Compound of example 3 | 2270 |
| Compound of example 4 | 1650 |
| Compound of example 5 | 2120 |
| Compound of example 6 | 2310 |
| Compound of example 7 | 1950 |
| Compound of example 8 | 1570 |
| Compound of example 9 | 1320 |
| Compound of example 10 | 1250 |

EXAMPLE 12

2 g of each of the compounds given in table 2, 1 g of octadecyl 3(3,5-di-t-butyl-4-hydroxyphenyl)propionate (antioxidant) and 1 g of calcium stearate are mixed intimately with 1000 g of polypropylene MI=3.3 (Moplen C produced by Montedison). The mixture obtained is extruded at a temperature of 210°–230° C. and transformed into granules, from which multifilaments are obtained by operating under the following conditions:
  temperature of extruder: 230°–250° C.
  temperature of die: 240°–250° C.
  stretching ratio: 1:3
  multifilament count: 7920/396

The fibres, mounted on white cardboard, are exposed in a Weather-Ometer 65 WR with a black panel temperature of 63° C. The photodegradation effect on the samples is evaluated by measuring the loss of tensile strength after exposure to light for different periods, and calculating the exposure time ($T_{50}$) necessary for reducing the initial tensile strength value to 50%. The results obtained are given in table 2.

TABLE 2

| Stabiliser | $T_{50}$ (hours) |
| --- | --- |
| 2-hydroxy-4-n-octyloxybenzophenone | 200 |
| Compound of example 1 | 820 |
| Compound of example 2 | 890 |
| Compound of example 4 | 700 |
| Compound of example 5 | 810 |

EXAMPLE 13

2 g of each of the compounds given in table 3 are mixed intimately with 1000 g of high density polyethylene of MI=0.32 (Moplen RO ZB-5000, produced by Montedison), 0.5 g of tris (3,5-di-t-butyl-4-hydroxybenzyl)isocyanurate (antioxidant) and 1 g of calcium stearate.

The mixture obtained is then extruded at a temperature of 190° C. and transformed into granules, from which plates of 0.2 mm thickness are obtained by diecasting at 200° C. The plates are exposed in a Weather-Ometer 65 WR with a black panel temperature of 63° C., and the increase in the content of carbonyl groups (ΔCO) is checked periodically, using the non-exposed samples for compensating the initial absorption of the polymer.

The time (T 0.1) necessary for giving a ΔCO%=0.1 at 5.85 μm is calculated. As a comparison, polymer plates are prepared under the same conditions as follows:

(a) without adding a light stabiliser
(b) with the addition of 2 g 2-hydroxy-4-n-octyloxybenzophenone as a light stabiliser Table 3 gives the results obtained.

TABLE 3

| Stabiliser | T 0.1 (hours) |
| --- | --- |
| Without light stabiliser | 320 |
| 2-hydroxy-4-n-octyloxybenzophenone | 1000 |
| Compound of example 1 | >4000 |
| Compound of example 2 | >4000 |
| Compound of example 3 | >4000 |
| Compound of example 4 | >4000 |
| Compound of example 5 | >4000 |
| Compound of example 6 | >4000 |
| Compound of example 7 | >4000 |
| Compound of example 9 | >4000 |

We claim:

1. Compound of formula

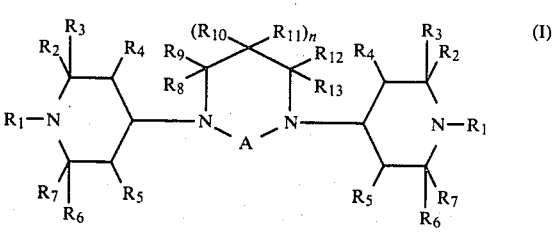

in which:

$R_1$ represents hydrogen, —O·, —CN, a linear or branched alkyl containing 1 to 20 carbon atoms, an alkenyl or alkinyl containing 2 to 20 carbon atoms, benzyl, benzyl substituted by 1 to 3 alkyls containing 1 to 4 carbon atoms, hydroxybenzyl, hydroxybenzyl substituted by 1 to 3 alkyls containing 1 to 4 carbon atoms; or a —COR$_{14}$, —COOR$_{14}$, —CH$_2$COOR$_{14}$ or —CONR$_{14}$R$_{15}$ radical in which R$_{14}$, R$_{15}$, which can be equal or different, represent a linear or branched alkyl containing 1 to 20 carbon atoms, an alkenyl containing 2 to 20 carbon atoms, a cycloalkyl containing 5 to 12 carbon atoms, phenyl, phenyl substituted by 1 to 3 alkyls containing 1 to 8 carbon atoms, hydroxyphenyl, hydroxyphenyl substituted by 1 to 3 alkyls containing 1 to 4 carbon atoms, an aralkyl containing 7 to 12 carbon atoms, or when bonded to N they can be hydrogen, or together with the N to which they are bonded they can form from five to eight membered nitrogenous containing heterocyclic rings or a

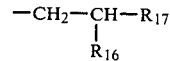

radical in which R$_{16}$ is hydrogen or methyl, and R$_{17}$ is —OH, —OR$_{14}$, —OCOR$_{14}$ or —CONR$_{14}$R$_{15}$, in which R$_{14}$ and R$_{15}$ are always as heretofore defined; or a

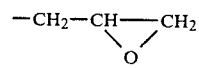

radical;

$R_2$, $R_3$, $R_6$, $R_7$, which can be equal or different, represent an alkyl containing 1 to 6 C atoms;

$R_4$, $R_5$, which can be equal or different, represent hydrogen or an alkyl containing 1 to 6 C atoms;

$R_8$, $R_9$, $R_{10}$, $R_{11}$, $R_{12}$, $R_{13}$ which can be equal or different, represent hydrogen or an alkyl containing 1 to 6 carbon atoms; n is zero or 1;

A represents >C=O, >C=S, or >CH—$R_{18}$ in which $R_{18}$ is hydrogen, an alkyl containing 1 to 20 carbon atoms, a cycloalkyl containing 5 to 12 carbon atoms, phenyl, a hydroxyphenyl, a hydroxyphenyl substituted by 1 to 3 alkyls containing 1 to 4 carbon atoms, benzyl, or benzyl substituted by 1 to 3 alkyls containing 1 to 4 carbon atoms.

2. Compounds as claimed in claim 1, in which $R_1$ represents hydrogen or a $C_1$-$C_6$ alkyl; $R_2$, $R_3$, $R_6$, $R_7$ represent methyl or ethyl; $R_4$, $R_5$ represent hydrogen or methyl; $R_8$, $R_9$, $R_{10}$, $R_{11}$, $R_{12}$, $R_{13}$ represent hydrogen or methyl; n is zero or 1, A is >C=O, >C=S, >$CH_2$, >$CHR_{18}$ in which $R_{18}$ is a $C_1$-$C_6$ alkyl.

3. A compound as claimed in claim 1 of formula

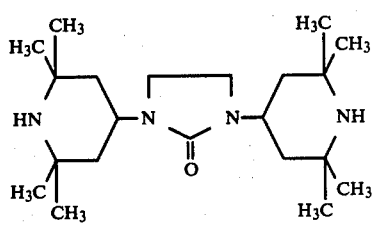

4. A compound as claimed in claim 1 of formula

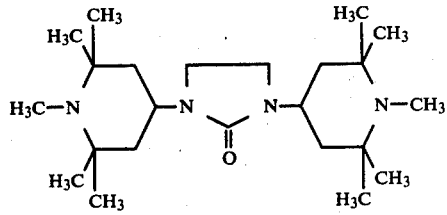

5. A compound as claimed in claim 1 of formula

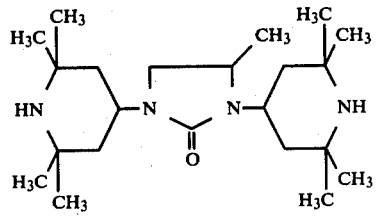

6. A compound as claimed in claim 1 of formula

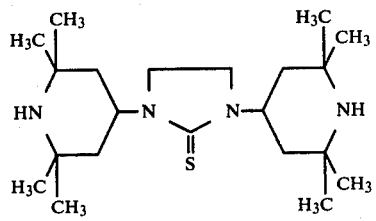

7. A compound as claimed in claim 1 of formula:

8. A compound as claimed in claim 1 of formula:

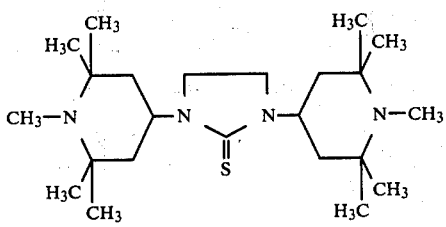

9. A compound as claimed in claim 1 of formula:

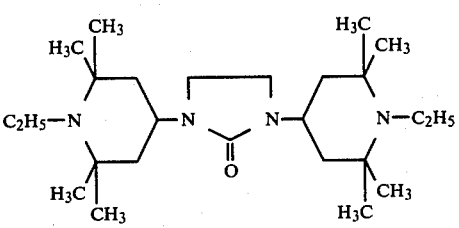

10. A compound as claimed in claim 1 of formula:

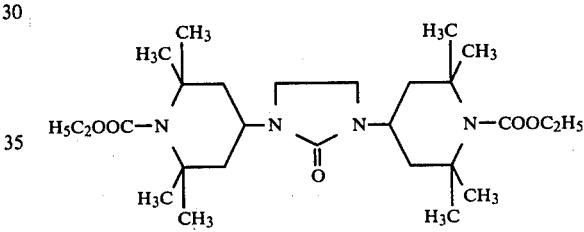

11. A compound as claimed in claim 1 of formula:

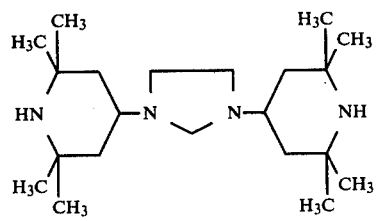

12. A compound as claimed in claim 1 of formula:

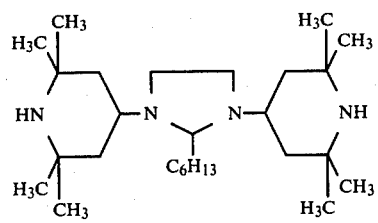

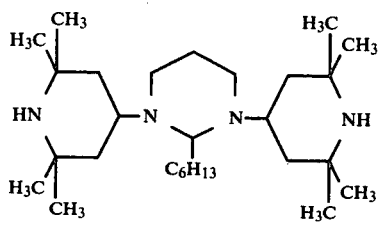

13. Polymer compositions stabilised against light, heat and oxidation, comprising a synthetic polymer and a stabilising compound of formula (I) as claimed in claim 1, in a quantity of 0.01 to 5%, and preferably 0.1 to 1% by weight, with respect to the weight of the synthetic polymer.

14. Compositions as claimed in claim 13, which also comprise other normal additives for synthetic polymers in addition to the new stabilisers.

15. Compositions as claimed in claim 13, wherein the synthetic polymer is high density or low density polyethylene.

16. Compositions as claimed in claim 13, wherein the synthetic polymer is polypropylene.

* * * * *